United States Patent
Ramirez-Tobias et al.

(10) Patent No.: US 6,599,123 B2
(45) Date of Patent: Jul. 29, 2003

(54) METHOD TO PRODUCE CEMENT CLINKER USING HIGH SULFUR CONTENT FUEL

(76) Inventors: Homero Ramirez-Tobias, Calle Talia #341 Col. Contry Tesoro, 64850 Monterrey Nuevo Leon (MX); Alberto Lazaro-Franco, Calle Alfonso Reyes #107 Col. Veradalta, Garza Garcia Nuevo Leon (MX); Juan C. Martinez-Burckhardt, Calle Alfredo B. Nobel #2121 Col. Contry Sol, 67174 Guadalupe Nuevo Leon (MX); Walter Lopez-Gonzalez, Calle Mision la Paz #6223, Col. Mision Cumbres, 64347 Monterrey Nuevo Leon (MX)

( * ) Notice: Subject to any disclaimer, the term of this patent is extended or adjusted under 35 U.S.C. 154(b) by 0 days.

(21) Appl. No.: 10/195,351

(22) Filed: Jul. 13, 2002

(65) Prior Publication Data

US 2003/0108842 A1 Jun. 12, 2003

(51) Int. Cl.⁷ .................................................. C04B 2/10
(52) U.S. Cl. ........................... 432/14; 432/13; 110/346; 110/347; 106/757; 106/758
(58) Field of Search ............................. 432/13, 14, 15, 432/16, 58, 106; 110/246, 346, 347; 106/739, 745, 757, 758

(56) References Cited

U.S. PATENT DOCUMENTS

| 4,120,645 | A | * | 10/1978 | Kohl et al. | .................. | 432/106 |
| 4,465,460 | A | * | 8/1984 | Cosar | .......................... | 432/106 |
| 4,561,842 | A | * | 12/1985 | Nielsen | ....................... | 432/106 |
| 5,698,027 | A | * | 12/1997 | Borgholm et al. | .......... | 106/739 |
| 6,050,813 | A | * | 4/2000 | Doumet | ....................... | 432/106 |
| 6,142,771 | A | * | 11/2000 | Doumet | ....................... | 432/14 |

* cited by examiner

Primary Examiner—Gregory Wilson
(74) Attorney, Agent, or Firm—Frommer Lawrence & Haug, LLP; A. Thomas S. Safford

(57) ABSTRACT

This describes a method for producing cement clinker using petroleum coke with a sulfur content over 4.5% by weight, in conventional equipment and facilities, wherein said method comprises the treatment of the raw mixture to synergistically improve its physical-chemical characteristics combined with the parameter control of the process, in such a way as to obtain a reduction of the clinkering temperature, all as a heretofore-unappreciated way to reduce, as a result, the concentration of SO3 in the calcinated material fed to the rotating kiln, and also usefully increasing with this the calcium sulfate content in the clinker.

5 Claims, 5 Drawing Sheets

METHOD TO PRODUCE CEMENT CLINKER USING HIGH SULFUR CONTENT FUEL

RELATED APPLICATION (foreign priority claim)

Benefit is claimed of the prior filing date of Mexican application no. PA/a/2001/007229, filed Jul. 13, 2001 in accordance with 37 CFR §1.55 AND 35 USC §119.

FIELD OF THE INVENTION

This invention relates to a method to produce a cement clinker and, specifically, a method to produce cement clinker using coke with a high-sulfur content as fuel, in order to minimize the problems related to the use of said fuel.

BACKGROUND OF THE INVENTION

The processes and plants used to manufacture cement clinker are well known. Generally, the manufacturing process consists in preparing a raw meal (raw mixture) comprising a mixture of materials such as limestone ($CaCO_3$), clay (argillaceous) materials (e.g., $SiO_2$, $Al_2O_3$) and iron minerals (e.g., $Fe_2O_3$). Said raw meal preparation includes the steps of drying, pulverizing and supplying said materials in adequate proportions to achieve a clinker with the required composition to obtain a product having the final quality desired. Once the raw meal is prepared, pulverized and homogenized with the required composition, the next steps in the process are: feeding said raw meal to a kiln passing through a pre-heater; calcining said preheated raw meal to transform the $CaCO_3$ into CaO and $CO_2$; feeding the calcined meal to a sintering kiln; sintering (also known as clinkering) the calcined meal to form the clinker compounds such as tricalcium silicate (alite), dicalcium silicate (belite), tricalcium aluminate and tetracalcium aluminoferrite.

Typically, in order to carry out this drying, calcining and sintering process (clinkering), high amounts of energy are required to maintain the high temperatures in the process, the required temperature in the sintering step being about 1450° C., which to achieve and maintain requires the consumption of large amounts of fuel.

Currently, the availability of fuels with a high-sulfur content and their lower cost represent an opportunity for the cement industry, however, their use requires special operation and handling with new methods to facilitate their use without detriment to the continuous operation of the kiln.

One of the available lower cost fuels is petroleum coke having a high-sulfur content. Due to its nature, it typically has a high sulfur content of more than 4.5% elemental sulfur. The sulfur included in the fuel has a significant effect when included in the combustion process. On the one hand, this type of fuel generates the heat necessary to maintain the process temperature. On the other hand, it produces $SO_2$ which, added to the $SO_2$ coming from the sulfur content in the raw materials used to form the raw meal, represents a significant amount. This sulfur content can produce blockages in the preheater, if steps or special measures are not taken or adequate compensating methods are not used for processing.

As is known, the $SO_2$ contained both in the combustion gases as well as in the raw meals come in direct contact with the CaO (lime), forming sulfated calcium compounds (calcium sulfites and sulfates $CaSO_3$ and $CaSO_4$). When subjected to the high temperatures for forming the clinker compounds, which are higher than the decomposition temperature, the sulfated compounds decompose again into $SO_2$ and CaO. The latter reacts to form new clinker compounds, and the $SO_2$ carried in the combustion gases returns back towards the kiln solids inlet to again react with incoming fresh CaO. In this way, a continuous cycle is set up with ever increasing sulfur concentrations. Upon reaching high enough concentrations of $SO_2$, and having no outlet, sulfur compounds precipitate on the coldest areas of the preheater forming accumulations and blockages, such as in the preheater, the fume chamber, etc. This causes operational disturbances by reducing efficiency and, in more serious cases, stops the operation altogether; for example, when rings form in the clinkering kiln.

In the art, there have been a number of efforts attempting to design installations, equipment and/or processes to enable the use of high sulfur content solid fuels by seeking to solve the problems related to the formation and excessive accumulation of $SO_2$. However, the majority of the processes and/or plants to manufacture cement clinker using high sulfur content solid fuel present certain disadvantages with respect to the complexity of the processes and equipment, as well as high costs.

Examples of such prior art are to be found in patents discussed below(which are incorporated herein by reference).

See for instance, the U.S. Pat. No. 4,465,460, entitled "Production of cement clinker" issued to Paul Cosar on Aug. 14, 1984. This relates to the use of high sulfur content solid fuels in the production of cement clinker in rotating kilns. The solid fuel is gasified and the gasified fuel is contacted with a fraction of the raw material used for the production of cement clinker to desulfurize the gasified fuel. The gasified desulfurized fuel is then discharged towards calcining step to provide calories to the same. In addition, it is mentioned that the factors to increase the desulfurization reaction are the gas temperature in the range of approximately 800° C. to 950° C. and the fine granulation of the raw material, preferably to an average the grain size of approximately 100 microns. This patent requires complex facilities and processes to produce cement clinker, which includes additional equipment to reduce the sulfur content or to desulfurize the combustion gases. The combustion gases are placed in contact with a fraction of the raw material to, thus, desulfurize said combustion gases by the partial reaction of the $SO_2$ with the CaO. However, the control of operation parameters is not mentioned to teach how to avoid the decomposition of the sulfated compounds formed in prior steps, before the calcinated raw material is sintered. In other words, said patent specifically describes a process and installation to reduce to a minimum the sulfated compounds contained in combustion gases specifically. Thus, there is no suggestion as to how effectively to avoid the problems related to the accumulation of sulfated compounds in the overall system.

U.S. Pat. No. 4,662,945 (method) and its divisional U.S. Pat. No. 4,715,811 (apparatus), both entitled "Process and apparatus to manufacture low sulfur cement clinker" issued to Thomas R. Lawall on May 5, 1987 and Dec. 29, 1987, respectively, describe a process and apparatus to manufacture low sulfur cement clinker from cement raw meal containing sulfur or with fuel containing high levels of sulfur or a combination thereof. The apparatus includes a preheater, calcining kiln, clinkering kiln and clinker cooler. A separate source of fuel is added at the end of the clinkering kiln to maintain reducing conditions and temperatures for decomposing the sulfur compounds. The fuel added at the end of the clinkering kiln is carbon or coke fuel with low volatility. This patent relates to the production of a cement clinker with low sulfur content by means of separating the sulfur compounds under reductive conditions. To obtain said clinkers with a low-sulfur content, the use of added equipment and steps specially designed to operate under said reductive conditions are required. The obtained product is a clinker with a low alkaline sulfur content. Notwithstanding, said patent does not make reference either to the sintering temperature reduction nor to the improvement or pretreatment of the raw material effective to avoid the accumulation of sulfated compounds in the system, but focuses instead on eliminating the sulfated compounds during the calcining step.

The U.S. Pat. No. 6,142,771, entitled "Control of cement clinker production using high sulfur fuel in a Lelep-Lepol travelling grate rotary kiln by analysis of sulfur in the end product" issued to Joseph Doumet on Nov. 7, 2000, describes a method and apparatus of producing cement clinker using a high-sulfur content fuel. The high-sulfur content fuel is fed to a burner disposed in the clinkering kiln and mixed with the raw meal before entering the clinkering kiln. The object of this invention is to control the oxygen and carbon monoxide concentrations, as well as the sulfur content in the cement clinker to control the system. To use fuels with high sulfur content and to avoid problems related to same, the object of this invention is to control the speed of the gas exhauster placed on the kiln outlet and the fuel flow which is to be used in the process, to thus allow control of the oxygen amount in the chemical reaction zone/sintering of the clinkering kiln. This type of apparatus is inefficient for controlling the amount of $SO_3$ in the resulting cement clinker and has delayed response time for correcting the operating conditions.

Another effort in the art to use petroleum coke is disclosed in the China patent number 1,180,674 issued to Wang Xinchang, et al., on May 6, 1998, entitled "Method to produce high quality cement using petroleum coke with a high sulfur content". The method includes the steps of spheroidizing the petroleum coke mixture with high sulfur content, limestone, clay, iron dust, carbon and fluorite; calcining to obtain the clinker; mixing with gypsum; and pulverizing. The sulfur content of said coke could be from 2 to 6%, which can replace the carbon by 20–100%. The cement obtained up to more than 425R characteristics and high resistance. The method is based on mixing the raw materials with petroleum coke to later be granulated and burned in a vertical kiln. However, this creates problems with respect to the appropriate dosage of the mixture to carry out the decarbonation (calcination) of the calcinated mixture, which results in an inefficient reaction.

Further efforts are disclosed, for example, in U.S. Pat. No. 5,707,444 (Soren Hundebol), which relates to the amount of fuel used in the kiln. In adjusting the same in accordance with the calculation of the sulfur evaporation, this Hundebol patent focuses on the adjustment related specifically with the temperature control of the clinkering kiln. See also U.S. Pat. No. 6,050,813 (Joseph Doumet), which describes control of the cement clinker production by means of the operating parameters, such as by control of the amount of oxygen at the kiln inlet via the measurement of the $SO_3$ content in the clinker at the cooler exit, the drawback being that the information on the $SO_3$ obtained in the clinker to control the amount of oxygen fed is delayed and, thus, can not provide an adequate control on line for the production of a clinker, because the operating conditions do not correspond to those during the formation of the clinker being analyzed. See also U.S. Pat. No. 6,183,244 (Joseph Doumet), which relates to the production of clinker using fuel with high sulfur content in a wet rotating kiln.

The U.S. Pat. No. 5,698,027 entitled "Method and Plant for manufacturing mineralized Portland cement clinker" issued to Hans E. Borgholm, et al, on Dec. 16, 1997, describes the use of a mineralizer which has no detrimental effect on the flow properties of the raw meal, which is preferably added after the preheater for homogenization with the feedstock in the preheater or calciner. Said mineralizer can be, for example, a sulfur-containing component (such as a by-product in the desulfurization of the fuel gas) and/or a fluorine-containing compound. The mineralizer can be directly fed to the raw mixture, to the calciner or through hot air from the cooler towards the calciner. It does not mention the kiln temperature control or to its stabilization, to avoid sulfur evaporation provided as a by-product of desulfurization of the fuel gas, i.e., the decomposition of the sulfated compounds. This would generate problems in the system, such as the accumulation, blockage and the formation of rings due to said sulfur compounds.

It has also been considered to improve the burnability of the raw materials or raw meal for the purpose of reducing the sintering temperature (clinkering) and, thus, to avoid the decomposition temperature of the sulfated compounds to be achieved. Examples of methods and apparatus to burn granulated or pulverized products to manufacture cement clinker are described, for example in the U.S. Pat. No. 6,000,145 issued on Dec. 14, 1999; U.S. Pat. No. 4,496,396 issued on Jan. 29, 1985; U.S. Pat. No. 4,561,842 issued on Dec. 31, 1985; and U.S. Pat. No. 4,557,688 issued to Nielsen Peter B., on Dec. 10, 1985. However, all the above-mentioned patents are related to the preparation of raw materials as a conventional phase in the clinker manufacturing process, substituting the rotating kiln with stationery reactors, without taking into consideration the decomposition of the sulfur compounds. In a relevant form, the U.S. Pat. No. 5,800,610 issued to Ebbe S. Jons on Sep. 1, 1998, entitled "Method for manufacturing cement clinker", describes to initially subject the raw meal to a preparatory processing, e.g., by comminution, homogenization and/or drying. Nevertheless, this method is carried out on fixed burning reactor, and there is no mention of the form in which said preparatory processing is carried out nor of the operating conditions.

According to the above, there is no document in the prior art that describes or suggests the reduction of the clinkering or sintering temperature by means of parameters to control of the raw mixture, in the operation of the kiln and the $SO_3$ level at the kiln inlet. Thus, there is the need for a method for producing cement clinker which will allow a more economic and efficient use of fuels with a high sulfur content, such as petroleum coke, but that at the same reduces to the minimum the problems associated with blocking and incrustations due to the high concentration of $SO_2$ and/or $SO_3$ in the system.

Therefore, the object of the present invention is to provide a method to produce cement clinker with a simple operation and, however that is highly efficient to consume 100% of the petroleum coke.

It is a further object of the present invention is to produce a high quality cement clinker, which does not require the addition of additives to improve its final physical properties.

Yet, another object of the present invention is to provide a method to produce cement clinker that can be used in any conventional process and facility; thus avoiding the need for any added capital costs to accommodate for use of fuels with high sulfur content.

SUMMARY OF THE INVENTION

The present invention relates to a method for producing cement clinker in a cement plant cement clinker from a conventional feedstock raw mixture, which method comprises the steps of:
  feeding the raw mixture to said plant;
  preheating the raw mixture;
  calcining the preheated raw mixture;
  sintering of the calcinated raw mixture to produce cement clinker; and
  cooling the cement clinker;
modifying the method to permit use of a fuel having a high sulfur content as a heat source for at least one of preheating, calcining, decarbonating and sintering of the raw mixture while preventing process-inhibiting build up of sulfur compound encrustations within said plant by:
  preparing a modified raw mixture before the feeding step based on the Lime Saturation Factor (LSF), the Silica Module (SM) and the Alumina Module (AM) and the fineness of the raw mixture, wherein the LSF is up to 1, the SM is between 2 and 3.5, the AM is between 0 and 3, and the fineness is on the order of mesh size no. 200, which in combination are adequate to reduce the conventional temperature in the clinkering step by more or less 100° C., from about 1500–1450° C. down to about 1400–1350° C., while maintaining essentially the same low percent of free CaO; and
  controlling the residence time of the calcinated mixture, the clinkering temperature and the maintenance of oxidizing conditions at the kiln inlet at an excess of 4% to 5% during the clinkering step.

The fuller scope of the invention in its broader aspects and its detailed working is set forth below.

BRIEF DESCRIPTION OF THE DRAWINGS

In this specification and in the accompanying drawings, we have shown and described preferred embodiments of our invention and have suggested various alternatives and modifications thereof; but it is to be understood that these are not intended to be exhaustive and that many other changes and modifications can be made within the scope of the invention. The suggestions herein are selected and included for purposes of illustration in order that others skilled in the art will more fully understand the invention and the principles thereof and will thus be enabled to modify it in a variety of forms, each as may be best suited to the conditions of a particular use.

DETAILED DESCRIPTION OF ILLUSTRATIVE PREFERRED EMBODIMENTS OF THE INVENTION

Figure 1:
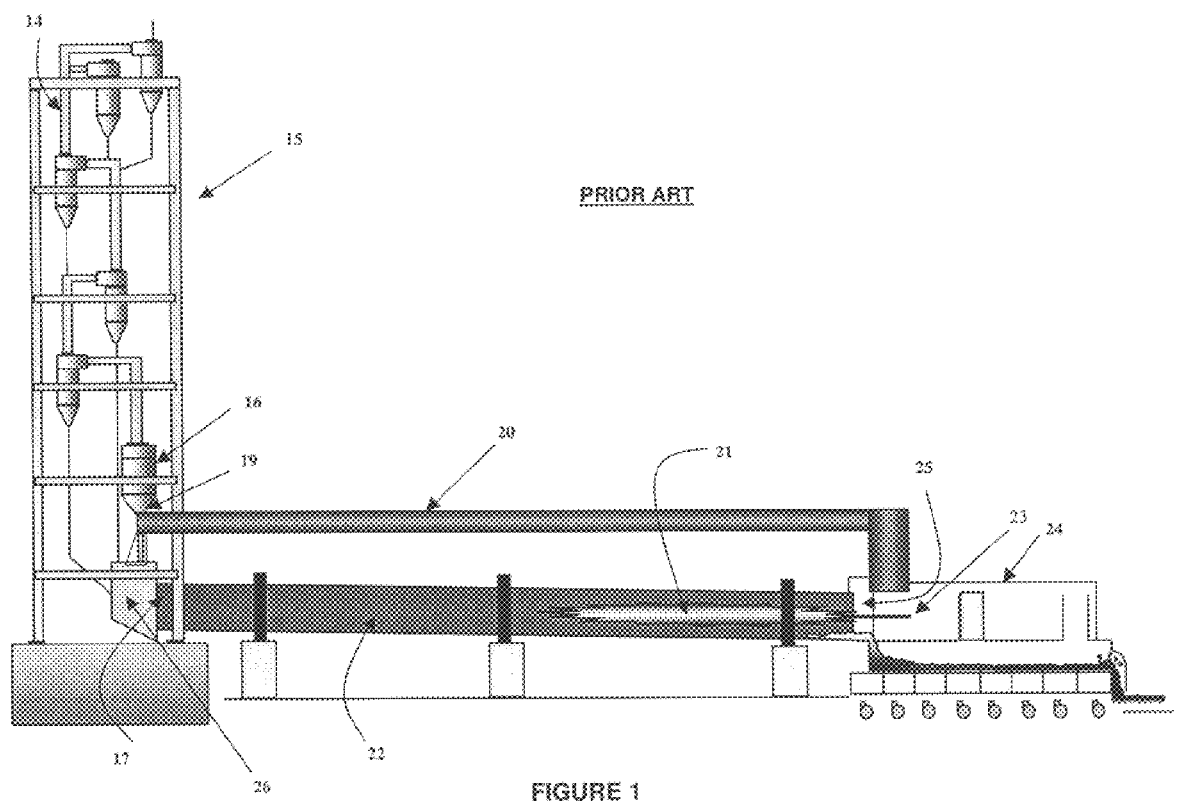
FIG. 1 is a schematic diagram illustrating a process to produce cement clinker according to prior art.

Referring to the drawings, FIG. 1 shows a schematic diagram of a typical prior art process to produce cement clinker. The process includes the steps of: feeding the raw mixture through a feeding line 14, preheating the raw mixture through a preheating system 15 (shown as a typical cascade of cyclone separators), precalcining the preheated raw mixture by means of a precalciner 16, sintering the calcinated raw mixture in a rotating kiln 22 to, thus, produce the cement clinker and cooling the cement clinker, by means of a cement clinker cooler 24. For thermal efficiency, the usual tertiary air duct 20 is included for carrying the hot exhaust air for the cooler 24 to the precalciner 16.

In the known processes for producing cement clinker using, for example the process shown in FIG. 1, the raw mixture fed to the rotating kiln 22 is preheated and partially decarbonated in a preheating system 15 and in a precalciner 16 using the heat of the combustion gases drawn from the rotating kiln 22 and from the precalciner 16. As the combustion gases and the raw materials are mixed, the lime (CaO) in the raw mixture and the sulfur dioxide ($SO_2$) in the combustion gases react to form calcium sulfite ($Ca\ SO_3$). The calcium sulfite is formed in the preheater 15. The calcium sulfite, in turn, reacts with the oxygen inside the preheating system 15 to form calcium sulfate ($Ca\ SO_4$), if there is sufficient oxygen. If there is not sufficient oxygen in the atmosphere at the kiln solids inlet 17 to create a vigorously oxidizing atmosphere, the calcium sulfate may decompose into lime (CaO) and sulfur dioxide ($SO_2$) and generate accumulations in the kiln solids inlet 17. If there is an oxygen deficiency in the rotating kiln 22, the calcium sulfate may decompose at temperatures lower than 1500° C. This decomposition also leads to an increase in the sulfur dioxide concentration in the gas inside the kiln 22, which leads to deposits of calcium salts on the walls of the preheating system 15. The deposits of calcium salts increase when the fuel is a solid fuel with a high sulfur content (i.e., over 4.5%), such as petroleum coke, due to the increased concentration of sulfur dioxide in the gas of the kiln 22. The increased sulfur circulation in the gases causes an increase in the amount of calcium sulfite. This can result in deposits to a degree sufficient to block the kiln inlet 17, the preheater 15 (including the preheater cyclones and the lines connecting the cyclones), thus stopping production.

To ensure the efficient use of the petroleum coke with a high sulfur content (over 4.5% by weight), the applicants of the present invention have surprisingly found that based on the treatment of the raw mixture to improve its physical-chemical characteristics, combined with a control of the process parameters and, optionally, the use of mineralizers, one can reduce the clinkering temperature. As a result, the $SO_3$ concentration in the calcinated material fed to the rotating kiln is reduced. This increases the calcium sulfate content in the clinker. By proper application and combination of these variables according to the invention, one can use conventional processes and facilities already existing to avoid blockage problems in the preheater 15, blockage in the fume chamber 26, and the formation of rings in the sintering kiln 22 (caused in the prior art by high concentrations of sulfur in the combustion gases).

A non-limiting preferred embodiment of the invention is illustrated schematically and graphically in FIGS. 2 to 6, where like elements to those of the prior art device illustrated in FIG. 1 are given the same reference numbers but with 100 added.

Treatment of Raw Mixture

For the treatment of the raw mixture, also called targeted improvement, the applicants consider the evaluation and improvement of the burnability of the raw mixture by means of adjustment to the control modules, the adjustment to the fineness of the raw mixture measured in meshes n.200 and n.50, and the optional use of mineralizers.

The raw mixture is generally composed of limestone ($CaCO_3$), clays ($SiO_2$, $Al_2O_3$) and iron mineral ($Fe_2O_3$), in adequate ratios to achieve the quality desired for the cement clinker, i.e., in an adequate amount of the compounds mainly required to form the clinker, for example, tricalcium silicate. Control of the ratios of the raw materials is carried out by means of the relationship of the compounds ($SiO_2$, $Al_2O_3$, CaO, $Fe_2O_3$) called control modules. In general said control modules are: the Lime Saturation Factor (LSF), Silica Module (SM) and Alumina Module (AM).

The control modules are calculated in accordance with the following equations:

a) Lime Saturation Factor $$LSF = CaO/(2.8\ SiO_2 + 1.18\ Al_2O_3 + 0.65\ Fe_2O_3).$$

b) Silica module $$SM = SiO_2/(Al_2O_3 + Fe_2O_3).$$

c) Alumina module $$AM = Al_2O_3/Fe_2O_3$$

Figure 5:
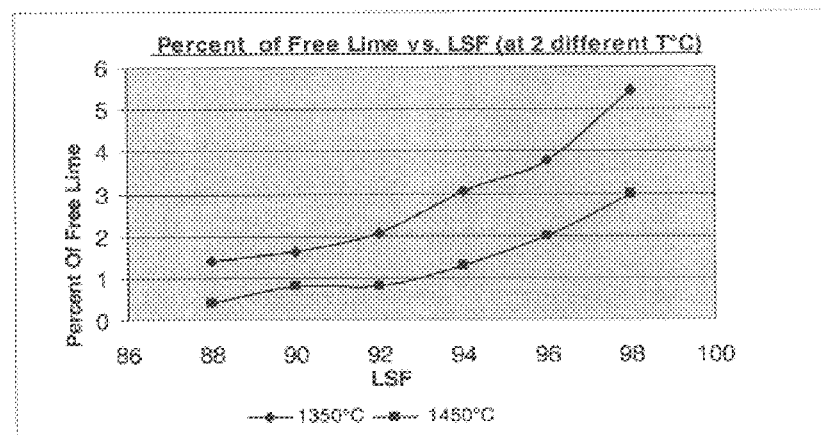
FIG. 5 is a graph, based on the values in Table 1 below, showing the percentage of free lime as a function of the Lime Saturation Factor (LSF), at two different temperatures.

As is known, high values in the control modules, for example, in the Lime Saturation Factor (LSF), the Silica Module (SM) and the Alumina Module (AM), result in raw materials difficult to transform into clinker (low burnability), see Table 1 and FIG. 5. These show the burnability of the raw mixture as a function of the LSF. In addition, we know that the fineness of the raw mixture (particle size) also affects the burnability thereof, while a finer raw mixture (see Table 2) the burnability improves. On FIG. 6, we can observe the effect of the fineness of the mixture with respect to its burnability.

TABLE 1

| | % of Free Lime | |
|---|---|---|
| LSF | T = 1350° C. | T = 1450° C. |
| 88 | 1.415 | 0.408 |
| 90 | 1.63 | 0.815 |
| 92 | 2.068 | 0.827 |
| 94 | 3.0385 | 1.304 |
| 96 | 3.78 | 2.00 |
| 98 | 5.44 | 2.979 |

TABLE 2

| Mesh-200 (for LSF 92) | Sample | Mesh-200 (for LSF 98) | LSF 92 % of Free Lime | | LSF 98 % of Free Lime | |
|---|---|---|---|---|---|---|
| | | | 1380° C. | 1450° C. | 1380° C. | 1450° C. |
| 76.75 | 1 | 76.75 | 1.95 | 0.74 | * | * |
| 78.75 | 2 | 78.00 | 1.82 | 0.67 | 2.75 | 1.44 |
| 80.74 | 3 | 80.40 | 1.62 | 0.62 | 2.21 | 1.11 |
| 82.66 | 4 | 83.70 | 1.45 | 0.51 | 1.88 | 0.92 |
| 85.17 | 5 | 84.30 | 1.42 | 0.49 | 1.86 | 0.74 |
| 87.00 | 6 | 86.60 | 1.35 | 0.45 | 1.69 | 0.68 |
| 89.00 | 7 | 88.00 | 1.31 | 0.41 | 1.61 | 0.61 |

By means of the treatment process of the invention with its selective targeting of the physical-chemical characteristics and fineness of the raw mixture, there is an unexpected improvement in the burnability of the clinker, thus allowing for reduction in the clinkering temperature such that, as a surprising result, the amount of calcium sulfate ($CaSO_4$) decomposition is reduced, so that enough intact calcium sulfate exits the kiln 122 as part of the clinker composition to prevent excess $SO_2$ build up in the clinker plant (thus stopping process-inhibiting sulfur compound deposits within the plant).

Figure 6:
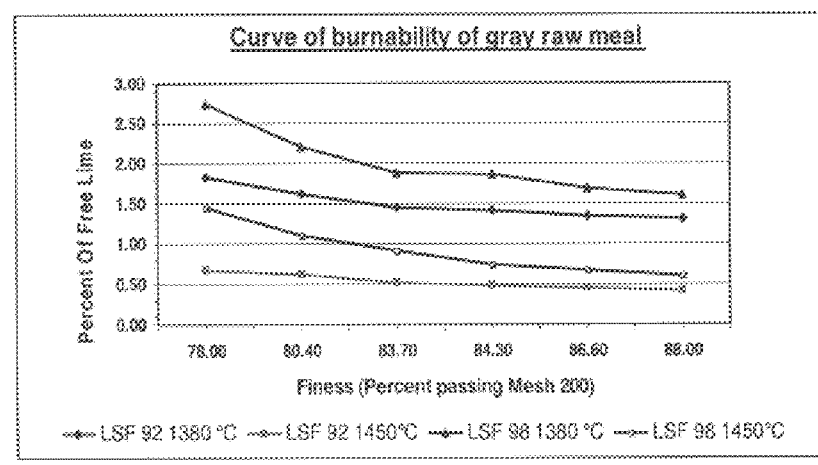
FIG. 6 is a graph, based on the values in Table 2 below, showing the burnability of the gray raw meal, in terms of the percentage of free lime as a function of the fineness of the meal (for two different LSF values, each at two different temperatures).

As can be observed from the graphics of FIGS. 5 and 6, the treatment to improve the raw mixture according to the invention allows a reduction in the clinkering temperature of more than 100° C. (without an increase in the percent of free lime, i.e. without sacrificing process efficiency).

Use of Mineralizers

It is known that the addition of small amounts of some compounds which normally do not constitute the raw mixture can alter the speed at which the clinkering reaction takes place. Compounds of this type, with an acceleration effect in the reaction speed and a reduction in the energy required for the clinkering reaction, are called mineralizers. The method to produce clinker of the present invention that reduces the clinkering temperature using coke with a high-sulfur content optionally uses $CaF_2$ (fluorite) as a mineralizer.

In the method of the present invention, the use of $CaF_2$ (fluorite) as a mineralizer helps to enhance the clinkering temperature reduction control achieved by means of the targeted improvement treatment of the raw mixture. The addition of the mineralizer to the raw mixture allows for the stabilization of the kiln operation. Furthermore, it helps to reach the desired free calcium values (CaO without reacting). Also, it makes it possible to maintain a temperature control in the sintering zone, thereby avoiding marked fluctuations and, therefore, maintaining the decomposition of the calcium sulfites and sulfates into sulfur dioxide at low levels (less than 50%). The mineralizer ($CaF_2$) is stored in the hopper 103 (see either of FIGS. 2 and 3) and is dosed through the feeder 107 to the raw mixture mill 108, in a ratio that varies from 0.2 to 0.5% by weight of the total composition.

Figure 2:
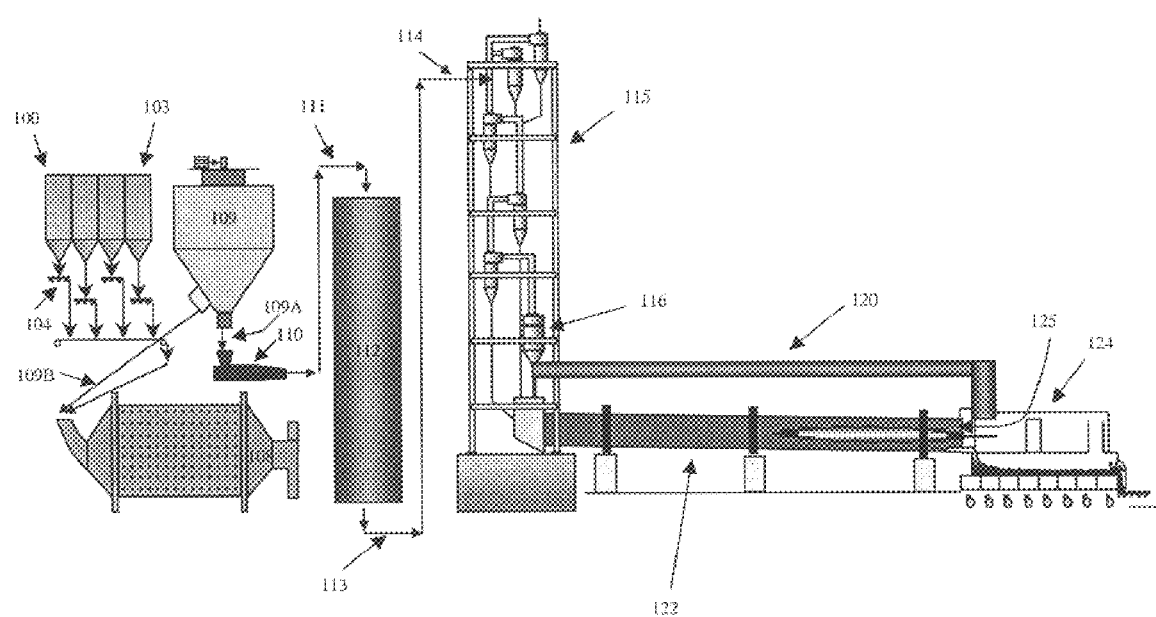
FIG. 2 is a schematic diagram illustrating the general process to produce cement clinker in accordance with the present invention.
Figure 3:
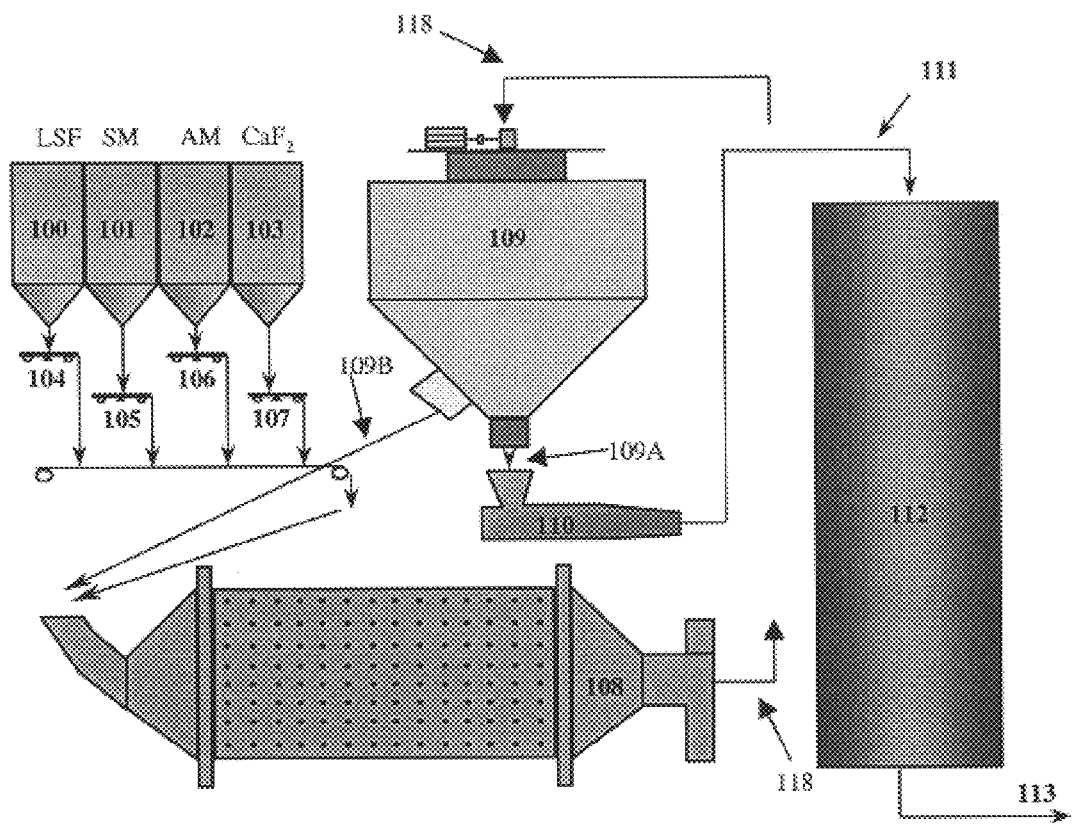
FIG. 3 is an enlarged view of the raw mixture treatment portion of the process in accordance with the present invention, as shown in FIG. 2.
Figure 4:
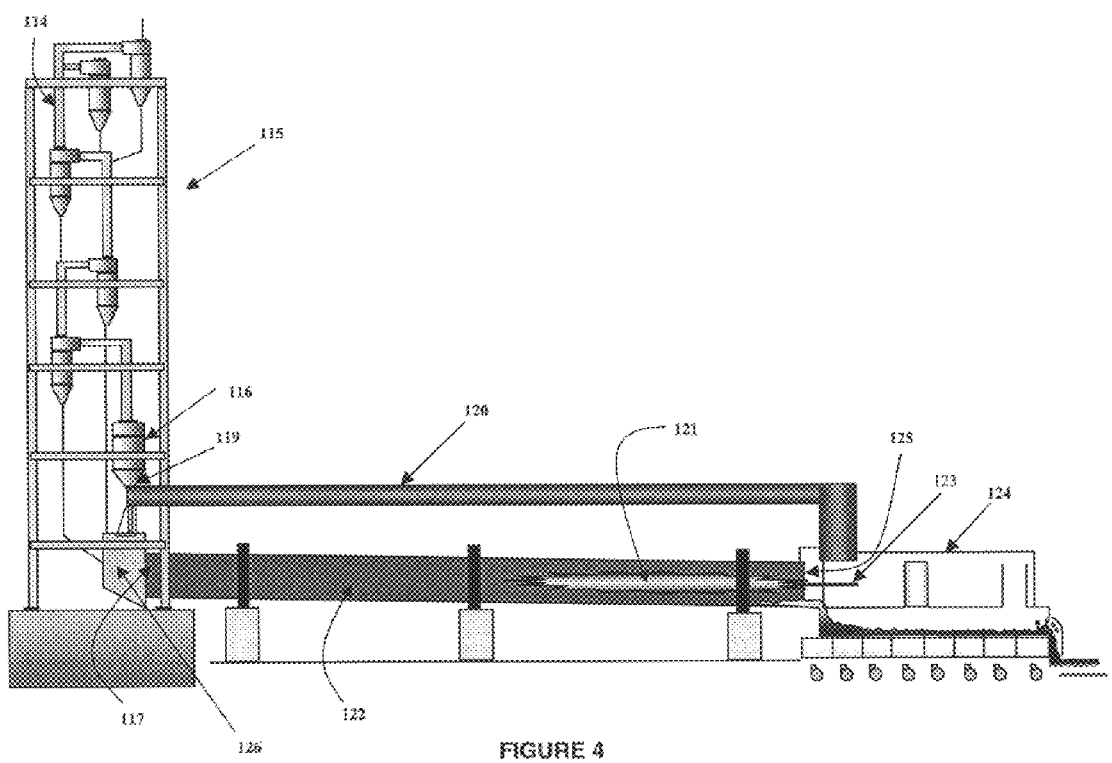
FIG. 4 is an enlarged view of the raw mixture, calcining, and subsequent clinkering portions of the process in accordance with the present invention, as shown in FIG. 2.

Referring to FIGS. 2 through 4, the method for producing cement clinker in accordance with the present invention is schematically shown. After the raw mixture has been treated to improve its physical-chemical characteristics as previously set forth (that is, the raw mixture is prepared by means of a milling system illustrated in either of FIGS. 2 and 3), the materials stored in the hoppers 100, 101 and 102 are dosed based on the control modules (such as the Lime Saturation Factor, the Silica Module and the Alumina Module previously mentioned) to obtain the appropriate levels in the raw mixture according to the invention.

After having determined the appropriate dosage levels of the materials, in accordance with the control modules, the resulting combination of these materials is fed, via the raw material feeders 104, 105, 106 and 107, to the mill 108, where it is pulverized, thus forming the raw mixture. After the materials are pulverized, the raw mixture is transported via line 118 from the mill 108 to a separator 109, where it is classified to obtain the desired fineness, i.e. to a determined effective particle size. Oversized particles of the raw mixture are recycled via line 109B to the mill 108. The bulk of the raw mixture, conditioned according to the present invention by said control modules and the fineness adjustment, is discharged at 109A onto a conveyor 110 for transport via line 111 to the homogenizer silo 112. There it is mixed for the purpose of reducing the fluctuation in the values of the control modules. The homogenizing process is basic to obtain a product with a constant quality, which will result in a continuous and efficient operation of the calcining system.

The conditioned raw mixture 113 coming from the homogenizer silo 112 is fed via line 114 ultimately to the rotating clinkering kiln 122; after first passing through the preheater 115, through the feeding line 114, and through the precalciner 116 in order to subject such raw mixture 113 to the heating, drying and decarbonating operations, by means of close contact with the combustion gases of the fuel fed to the burner 119 of the precalciner 116 and/or to the main burner 123 of the rotating clinkering kiln 122.

The calcinated raw mixture 113 is fed into the rotating kiln 122 at its solids inlet 117. As the kiln 122 rotates, the calcinated raw mixture 113 flows along the inside of the kiln 122 towards its outlet 125 (discharging hot solids into the cooler 124). Inside the rotating kiln 122, the chemical reactions to sinter the raw mixture 113 take place by means of the gases generated by combustion in the flame 121 of the fuel fed to the main burner 123 of the kiln 122. The sintered mixture, in the form of hot solids normally called clinker, exits the kiln 122 and passes on through the clinker cooler 124 (where it is cooled).

In accordance with the illustrated preferred method embodiment of the invention described herein, the petroleum coke is fed to the rotating kiln 122 through the main burner 123 and/or the precalciner's burner 119 in a conventional manner, as is known by one skilled in the art. As is also known, petroleum coke has a high concentration of sulfur which, under normal operating conditions of the kiln, without taking into consideration that this type of fuel requires adequate compensating steps for its use, will produce accumulations and blockages (such as blockages during the preheating steps, blockage of the fume chamber, etc.). These accumulations cause operating disturbances, reduce plant efficiency, and in more serious cases actually prevent continued operation (for example, when rings form in the clinkering kiln 122).

As is known, the sulfated compounds, such as $CaSO_3$ generated by the lime reaction (CaO) of the raw mixture and the sulfur dioxide ($SO_2$) contained in the combustion gases of the fuel with a high sulfur content, when subjected to the high formation temperatures of the clinker compounds (which are higher than their decomposition temperature), again decompose into $SO_2$ and CaO. The latter reacts forming new clinker compounds and the $SO_2$ returns with the combustion gases towards the kiln inlet to react again with the CaO, in such a way that it forms a cycle. When this reaches high concentrations of $SO_2$, without the possibility of escaping from the cycle, it precipitates onto the cooler areas.

The applicants of the present invention have surprisingly discovered that the use of their improved raw mixture with the control of certain process parameters, such as the residence time and control of $SO_3$ at the precalciner outlet, allows for a clinkering temperature reduction. This reduction results in a lower evaporation of the $SO_3$, with a reduction in the $SO_3$ concentration in the calcinated material fed to the rotating kiln, thereby increasing the calcium sulfate content in the clinker. In other words, applicants have discovered that it is basic to handle the temperature reduction at the clinkering step as an operating measure to achieve the use of coke with a high sulfur content avoiding to a maximum the problems related to same.

As previously mentioned, the ability to reduce the clinkering temperature is achieved by controlling the burnability of the raw mixture prepared during the milling step in the mill 108, by means of a combination of the variables related to the control and adjustment of fineness modules (particle size) of the raw mixture.

The decomposition process of the sulfur compounds (sulfur evaporation process) formed in the preheater due to the CaO reactions with the raw mixture and the $SO_2$ in the system shall be achieved inside the kiln when exposed to temperatures ranging from 1200 to 1500° C. To minimize the decomposition of these compounds, it is important to monitor and control certain specific operating parameters, such as exposition time or the residence time of the calcinated raw mixture, the clinkering temperature, the oxidizing conditions at the kiln inlet, in addition to the $SO_3$ content in the calcinated material.

In accordance with the present invention, the operating conditions of the clinkering kiln must be selected such that in combination with the improved raw materials, the optional use of the mineralizer, and the $SO_3$ control at the kiln inlet, one is able to control efficiently the use of coke with a high sulfur content (i.e. a content high enough to cause problems in a given clinkering system, normally with a content of more the 4.5% by weight of sulfur). The parameters that should be controlled are the temperature in the fume chamber, which should be under 1150° C.; the oxygen supply at the kiln inlet 117, which should be sufficient to maintain a highly oxidizing atmosphere (preferably over 4.5%); the percentage of $SO_3$ in the calcinated mixture supplied at the kiln inlet 117, which preferably should have a maximum value of 5% by weight; and the percentage of $SO_3$ in the clinker produced, which preferably should be more than 1.8% by weight.

Once the initial maximum usable percentage of the high sulfur content coke has been reached and the kiln operation stabilized (i.e. without halts or disturbances due to blockages of sulfur-rich material deposited in the fume chamber 126 and the preheater 115), one can advantageously begin (if required) the step using of mineralizers in the process. The use of a mineralizer as an optional component of the improved raw mixture permits stabilization of the kiln operation, facilitates control of the free lime, and eliminates the need to vary the amounts of fuel used, achieving in this manner temperature stabilization in the clinkering zone (sintering), whereby such stability in the clinkering zone allows maintenance of stable $SO_3$ values in the clinker and, thus, withdrawal of sulfur from the system.

An important factor to achieve reduction of the clinkering temperature and to minimize the problems related to the sulfated compounds produced by the combustion gases generated due to burning fuel with a high sulfur content to obtain a clinker with adequate properties, resides in the measurement of the sulfur content which is extracted from the system and which is a part of the clinker composition measured as $SO_3$. The control parameter for the $SO_3$ in the clinker is established as a function of how much sulfur is fed to the system and as a percentage of sulfur evaporation (decomposition of the sulfated compounds) in the kiln 122. In an embodiment of the present invention, this control parameter is based between the value of the analysis and the specification, which when there is a variance it shall be necessary to make adjustments which can be made to the fuel considering the value of the free lime in the clinker, the raw mixture fed to the kiln and the amount of oxygen at the kiln inlet by controlling the speed of the main kiln blower.

The method for producing cement clinker of the present invention, also considers as another important factor for the control of the process previously mentioned, the measurement of the $SO_3$ in the calcinated material coming from the previous cyclone to the kiln inlet 117, the increase in the $SO_3$ content in this calcinated material indicates that the sulfur cycle (inside the system) is concentrating. Thus, the clinker produced in the rotating clinkering kiln utilizing the method of the present invention using coke with a high sulfur content allows for a reduction in, and even eliminates the need for, addition of gypsum ($CaSO_4.2H_2O$) in the cement, as regulator of the setting times.

We provide the following examples only for illustrative purposes and in no way are they intended to limit the scope of the present invention.

EXAMPLES

The following example schematizes the results from improving the raw mixture in an industrial application of the disclosed inventive method.

Two raw mixtures were prepared, one in accordance with the control parameters according to the invention as previously mentioned, and second a standard typical prior art reference raw mixture, in which no inventive special control was made.

TABLE 3

| Parameters | Raw mixtures | |
| --- | --- | --- |
| | Standard per prior art | Improved per invention |
| LSF | 0.98 | 0.95 |
| SM | 2.9 | 2.9 |
| AM | 2.9 | 2.9 |
| Mesh 200 (in % passing screen) | 78 | 82 |
| % Free lime at 1450° C. | 2.07 | 1.03 |
| % Free lime at 1350° C. | 3.2 | 1.89 |
| % of $SO_3$ in the calcinated material at the kiln solids inlet | 4.9 | 2.8 |

As noted in the foregoing table, once the raw mixture has been improved according to the invention, this results in a lowering by approximately 100° C. of the clinkering temperature. This can be seen in that at 1450° C. the free lime obtained in the unimproved mixture gives a value of 2.07 while the improved inventive mixture burned at only 1350° C. results in a free lime value of 1.89 (which is practically the same). This permits better adjustment of the operating parameters of the rotating kiln. Due to the lowered temperature, there is a lowered decomposition of the sulfated compounds inside the rotating kiln and thus a reduction in the $SO_3$ content of the calcinated materials at the kiln solids inlet and an increase of the calcium sulfur that exits as a component of the clinker.

We claim:

1. In a method for producing in a cement plant cement clinker from a conventional feedstock raw mixture, which method comprises the steps of:
   feeding the raw mixture to said plant;
   preheating the raw mixture;
   calcining the preheated raw mixture;
   sintering of the calcinated raw mixture to produce cement clinker; and
   cooling the cement clinker; modifying the method to permit use of a fuel having a high sulfur content as a heat source for at least one of preheating, calcining, decarbonating and sintering of the raw mixture while preventing process-inhibiting build up of sulfur compound encrustations within said plant by:
      preparing a modified raw mixture before the feeding step based on the Lime Saturation Factor (LSF), the Silica Module (SM) and the Alumina Module (AM) and the fineness of the raw mixture, wherein the LSF is up to 1, the SM is between 2 and 3.5, the AM is between 0 and 3, and the fineness is on the order of mesh size no. 200, which in combination are adequate to reduce the conventional temperature in the clinkering step by more or less 100° C., from about 1500–1450° C. down to about 1400–1350° C., while maintaining essentially the same low percent of free CaO; and
      controlling the residence time of the calcinated mixture, the clinkering temperature and the maintenance of oxidizing conditions at the kiln inlet at an excess of 4% to 5% during the clinkering step.

2. The method according to claim 1, wherein said fuel used to preheat, decarbonate and sinter the raw mixture is petroleum coke with a sulfur content of more than 4.5% by weight.

3. The method according to claim 1, wherein it comprises an additional step to add the mineralizer at the raw mixture preparation step to strengthen the control of the clinkering temperature reduction.

4. The method according to claim 3, wherein said mineralizer is $CaF_2$, which is added in a ratio that varies from 0.2 to 0.5% by weight of the total composition of the raw mixture.

5. The method according to claim 1, further comprising the step of controlling the concentration of $SO_3$ in the calcinated mixture that is fed to the clinkering kiln.

* * * * *